UNITED STATES PATENT OFFICE.

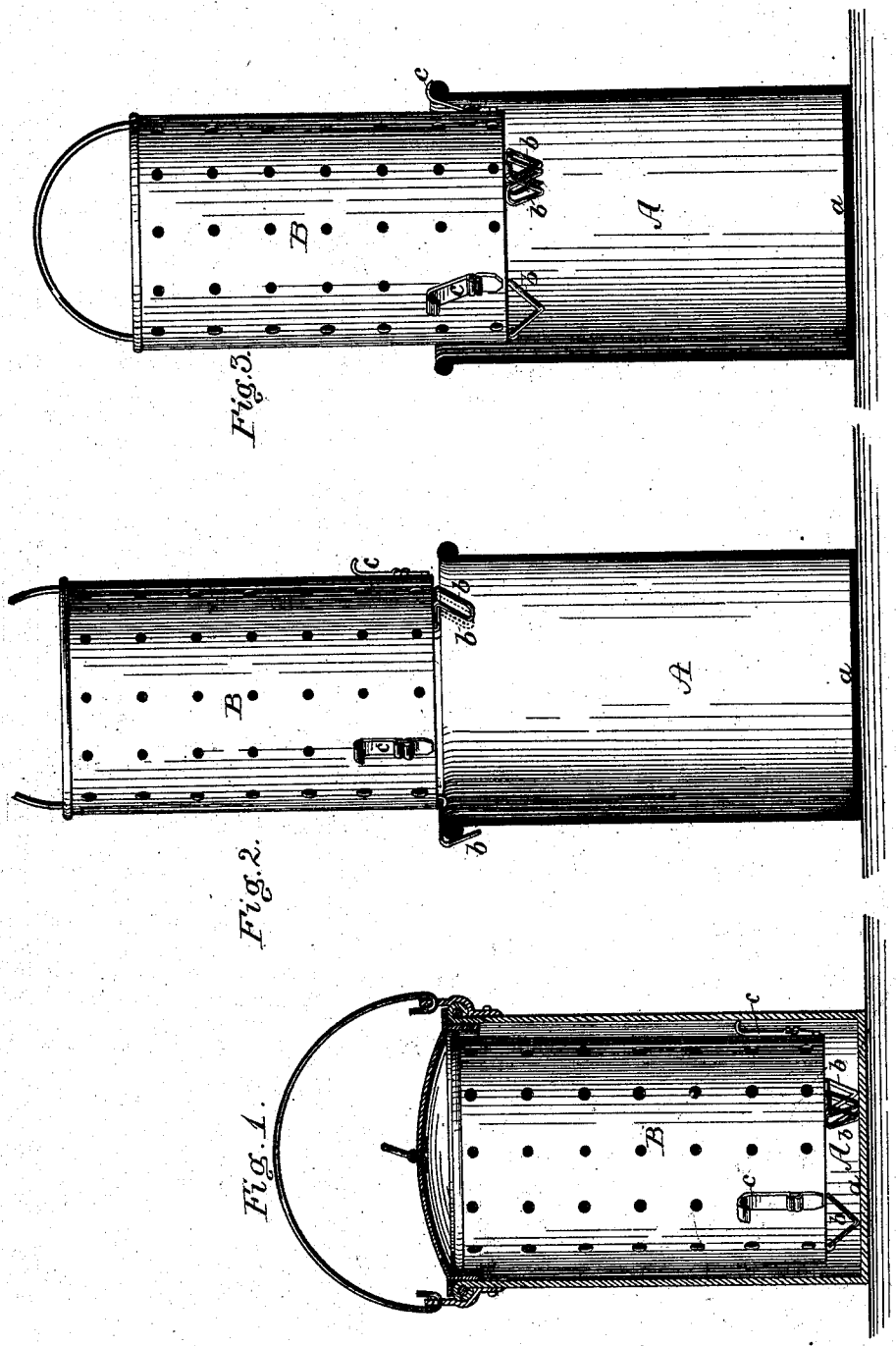
J. L. FOLLETT.
Culinary Vessel.
No. 211,076. Patented Dec. 17, 1878.

JOSEPH L. FOLLETT, OF NEW YORK, N. Y.

IMPROVEMENT IN CULINARY VESSELS.

Specification forming part of Letters Patent No. 211,076, dated December 17, 1878; application filed December 4, 1878.

*To all whom it may concern:*

Be it known that I, JOSEPH L. FOLLETT, of the city, county, and State of New York, have invented certain new and useful Improvements in Culinary Vessels, of which the following is a specification:

This invention relates to vessels or kettles for boiling vegetables or other articles.

It consists in providing, as the receptacle for the article or material to be boiled, a vessel, preferably perforated, adapted to enter and be held in any ordinary or suitable kettle or vessel, without contact with the sides and the bottom of the same, said perforated vessel being held from contact with the bottom of the outer vessel or kettle by hinged legs, which, when occasion requires, may be turned outwardly, to constitute hooks to rest or catch upon the rim of the outer vessel, and thus sustain the perforated kettle above the mouth of the outer vessel. When the perforated kettle occupies the latter position it acts as a strainer, to separate from the articles or material it contains the water, which is allowed to drain back into the larger kettle below. It can also be placed in this position to subject the vegetables or other articles to steaming action; but for this latter purpose I prefer to provide the vessel on its sides with hooks, which can be either folded up close against it or extended, in order to catch on the rim of the outer kettle, in which case the perforated vessel will be sustained with a portion of its length received and contained in the upper part of the outer vessel.

The nature of my invention and the manner in which the same is or may be carried into effect will be understood by reference to the accompanying drawing, in which—

Figures 1, 2, and 3 are sectional elevations of an article embodying my improvements, representing the inner kettle or vessel in different positions with respect to the outer kettle or vessel, as hereinbefore described.

The outer vessel, A, shown in section in the several figures, may be of any ordinary or suitable construction, and requires no further description.

The inner vessel, B, is of a size to fit within the outer one without contact with the sides of the latter. It is upheld from the bottom $a$ of the outer vessel by a suitable number of feet, $b$, three in the present instance. These feet are hinged to the bottom of the inner vessel, and are formed substantially as shown, so that when turned inwardly, as seen in Fig. 1, they will constitute a firm support for the vessel B, resting as they do on the bottom of the outer vessel, and when turned outwardly, as seen in Fig. 2, they will form hooks or rests to engage or project laterally over the rim of the outer kettle, and so uphold the inner vessel in a position above the kettle A.

In case the perforated vessel is to be used as a steamer, it may be desired to introduce its lower end into the kettle farther than the feet $b$ will permit. To this end I provide the vessel B with lateral hooks or catches $c$, hinged to the vessel, and adapted either to fold up closely against its sides when not required for use, as seen in Figs. 1 and 2, or to be extended laterally, as shown in Fig. 3, to catch over or upon the rim of the outer vessel, and so hold the inner vessel suspended and in part contained therein.

The vessel B may have perforations either in its sides or bottom, or in both; or, as the equivalent thereof, it may be made of wire, or otherwise constructed, to permit the liquid contained in the outer vessel to have access to its interior.

The improvements above described have been devised by me with particular reference to perforated inner vessels; but it is manifest that they may be applied also to such vessels or kettles when imperforate.

What I claim, and desire to secure by Letters Patent, is—

1. A vessel or kettle adapted to be received and contained within an outer vessel or kettle, and provided with hinged legs, arranged to turn outwardly, to form hooks or supports, substantially as and for the purposes set forth.

2. The culinary boiler herein described, consisting of an outer kettle or vessel and an inner perforated kettle or vessel provided with hinged supports, adapted to act either as legs or hooks, with or without lateral hinged hooks or catches, the whole being substantially as shown and set forth.

In testimony whereof I have hereunto set my hand this 2d day of December, 1878.

JOSEPH L. FOLLETT.

Witnesses:
C. F. WHITTEMORE,
EDWARD W. AVERY.